United States Patent
Kim et al.

(10) Patent No.: US 8,696,223 B2
(45) Date of Patent: Apr. 15, 2014

(54) SHUTTER DEVICE FOR CAMERA

(71) Applicant: Jahwa Electronics Co., Ltd., Cheongwon-gun (KR)

(72) Inventors: Hee Seung Kim, Seoul (KR); Ji Young Bang, Cheongju-si (KR); Kyung Won Kim, Cheongwon-gun (KR); Il Gyu Kang, Cheongju-si (KR)

(73) Assignee: Jahwa Electronics Co., Ltd., Cheongwon-gun (KR)

( * ) Notice: Subject to any disclaimer, the term of this patent is extended or adjusted under 35 U.S.C. 154(b) by 0 days.

(21) Appl. No.: 13/673,259

(22) Filed: Nov. 9, 2012

(65) Prior Publication Data
US 2013/0142503 A1 Jun. 6, 2013

(30) Foreign Application Priority Data
Dec. 2, 2011 (KR) .................. 10-2011-0128628

(51) Int. Cl.
*G03B 9/08* (2006.01)
*G03B 9/02* (2006.01)

(52) U.S. Cl.
USPC .......................................... 396/449; 396/510

(58) Field of Classification Search
USPC ......... 396/449–452, 458, 462–463, 505, 508, 396/510; 359/227
See application file for complete search history.

(56) References Cited

U.S. PATENT DOCUMENTS 6,714,362 B2 3/2004 Nomura et al.
7,699,546 B2 * 4/2010 Osoniwa et al. ............. 396/510

FOREIGN PATENT DOCUMENTS

| JP | 2001-117135 A | 4/2001 |
| JP | 2005-156897 A | 6/2005 |
| JP | 2011-175290 A | 9/2011 |
| KR | 10-0467650 A | 1/2005 |
| KR | 10-2009-0012497 A | 2/2009 |

* cited by examiner

*Primary Examiner* — W B Perkey
*Assistant Examiner* — Minh Phan
(74) *Attorney, Agent, or Firm* — LRK Patent Law Firm

(57) ABSTRACT

A shutter device for a camera is provided, which effectively provides an operating space of a shutter blade and a light-amount adjuster, improves assemblability of a top cover, and improves mechanical stability according to the assembly of the top cover by modifying the geometry of the top cover. The shutter device includes a driving unit driving a shutter blade and a light-amount adjuster, the shutter device including: a base where the driving unit is installed; a first plate placed on the top of the base; a second plate disposed on the top of the first plate; a top cover including first supports bent downward and supports projecting downward, where the first supports extend to pass through the second plate and support the top surface of the first plate, and the second supports are supported on the top surface of the second plate.

6 Claims, 4 Drawing Sheets

SHUTTER DEVICE FOR CAMERA

CROSS-REFERENCE TO RELATED PATENT APPLICATION

This application claims the benefit of Korean Patent Application No. 10-2011-0128628, filed on Dec. 2, 2011, in the Korean Intellectual Property Office, the disclosure of which is incorporated herein in its entirety by reference.

BACKGROUND OF THE INVENTION

1. Field of the Invention

The present invention relates to a shutter device for a camera and, more particularly, to a shutter device for a camera, which can effectively provide an operating space of a shutter blade and a light-amount adjuster, improve assemblability of a top cover, and improve mechanical stability according to the assembly of the top cover by modifying the geometry of the top cover.

2. Description of the Related Art

As well known in the art, shutters for cameras are divided into two types: a lens shutter located close to a photographic lens and a focal-plane shutter located immediately before a film or a CCD.

The lens shutter is configured such that a circular exposure aperture is opened and closed, and in general, the exposure aperture is opened from the center thereof and closed toward the center by a plurality of shutter blades. Moreover, a lens shutter having a single shutter blade is also available in which the exposure aperture is opened from a predetermined periphery thereof and closed toward the periphery after fully opened.

Meanwhile, a camera generally has a light-amount adjustment mechanism placed close to a photographic lens. Such light-amount adjustment mechanisms commonly used are called diaphragm mechanisms, which are of two main types. One is configured such that a plurality of shutter blades are rotated simultaneously in the same direction or rotated simultaneously in an opposite direction, and the diameter of the aperture can be continuously changed with respect to the optical axis by the cooperation of these blades. The other is configured such that, by providing a stop member with at least one circular aperture which is smaller in diameter than the exposure aperture or a plurality of stop members with a single aperture, the aperture can be selectively introduced into a photographing optical path.

In addition to the diaphragm mechanisms, mechanisms using neutral density (ND) filters are available for the light-amount adjustment mechanisms. In this case, there are those in which one ND filter having a predetermined density is introduced into the exposure aperture and those in which a plurality of ND filters different in density are provided and selectively introduced into the exposure aperture. In the mechanisms using the ND filters, there are those combined with the diaphragm mechanisms of the latter type, of the diaphragm mechanisms of the above two types. As an example, a circular aperture smaller in diameter than the exposure aperture is covered with the ND filter, and this covered aperture is introduced into the exposure aperture. Such a light-amount adjustment mechanism is suitable for the case where it is desirable that the influence of diffraction is excluded because the amount of light from an object can be materially reduced without extremely diminishing the aperture.

As discussed above, the lens shutter mechanism and the light-amount adjustment mechanism are not located immediately before the film or the CCD, but close to the photographic lens. Thus, in a camera provided with these two mechanisms including the lens shutter mechanism and the light-amount adjustment mechanism, it has been common practice to manufacture the two mechanisms as one unit. Examples of this configuration are set forth in detail in Japanese Patent Publication No. 2001-117135 and Korean Patent Publication No. 10-2009-0012497.

Meanwhile, the camera shutter device having a structure in which the lens shutter mechanism and the light-amount adjustment mechanism are simultaneously employed in the above camera has a shutter assembly comprising a shutter base having an aperture for incident light, shutter blades for blocking incident light, a blade driving unit for rotating the shutter blades, aperture blades for adjusting the amount of incident light, a driving unit for driving the aperture blades, a shutter plate for dividing a space in which the shutter blades and the aperture blades can move, and a shutter cover for protecting them. During assembly of the shutter cover, an adhesive is applied to a step height formed across the inner circumference of the shutter base on which the shutter cover is to be placed such that the shutter cover is attached and fixed thereto.

However, according to the above-described shutter cover assembly structure, when the shutter cover is assembled to the shutter base, the adhesive is applied to the entire circumferential surface of the shutter base, and then the shutter cover is attached thereto. Thus, the assembly operation is cumbersome and requires more assembly time. Moreover, the adhesive penetrates into the shutter base to affect the mechanical operation of the shutter device. Furthermore, since the shutter cover is fixed to the shutter base only using the adhesive, the adhesion of the shutter base is low, and thus the shutter cover may be separated from the shutter base. In addition, since the shutter cover is in contact with the edge of the shutter base and fixed thereto, the inner part of the shutter cover is vulnerable to deformation, and thus it may cause interference with the operation of the shutter blades or the aperture blades.

SUMMARY OF THE INVENTION

The present invention has been made in an effort to solve the above-described problems associated with prior art, and an object of the present invention is to provide a shutter device for a camera, in which a plurality of support structures, which can be simultaneously placed and supported on two plate members for dividing an operating space of a shutter blade and a light-amount adjuster, are formed on the bottom surface of a top cover, thus effectively providing the operating space of the shutter blade and the light-amount adjuster, further improving the assemblability of the top cover, and improving mechanical stability according to the assembly.

To achieve the above objects, the present invention provides a shutter device for a camera comprising a driving unit for driving a shutter blade and a light-amount adjuster, the shutter device comprising: a base on which the driving unit is installed; a first plate placed on the top of the base; a second plate disposed on the top of the first plate; a top cover including a plurality of first supports bent downward and a plurality of supports projecting downward, wherein the first supports extend to pass through the second plate and support the top surface of the first plate, and the second supports are supported on the top surface of the second plate.

The first supports may be disposed at regular intervals on the edge of the top cover.

A cut groove having a predetermined width may be formed on the left and right sides of the first support.

The first supports may be disposed on a thick sidewall of the base.

Each of the second supports may be formed into a hemispherical shape that projects from the bottom surface of the top cover.

BRIEF DESCRIPTION OF THE DRAWINGS

The above and other features and advantages of the present invention will become more apparent by describing in detail exemplary embodiments thereof with reference to the attached drawings in which.

Description of Reference Numerals

| | |
|---|---|
| 100: shutter assembly | 110: top cover |
| 112: first support | 114: second support |
| 120: second plate | 130: light-amount adjuster |
| 140: first plate | 150: shutter blade |
| 160: base | 170: driving unit |
| 180: bolt | 200: OIS assembly |
| 210: mover | 220: bottom cover |

DETAILED DESCRIPTION OF THE INVENTION

Hereinafter, preferred embodiments of the present invention will be described in detail with reference to the accompanying drawings.

Figure 1:
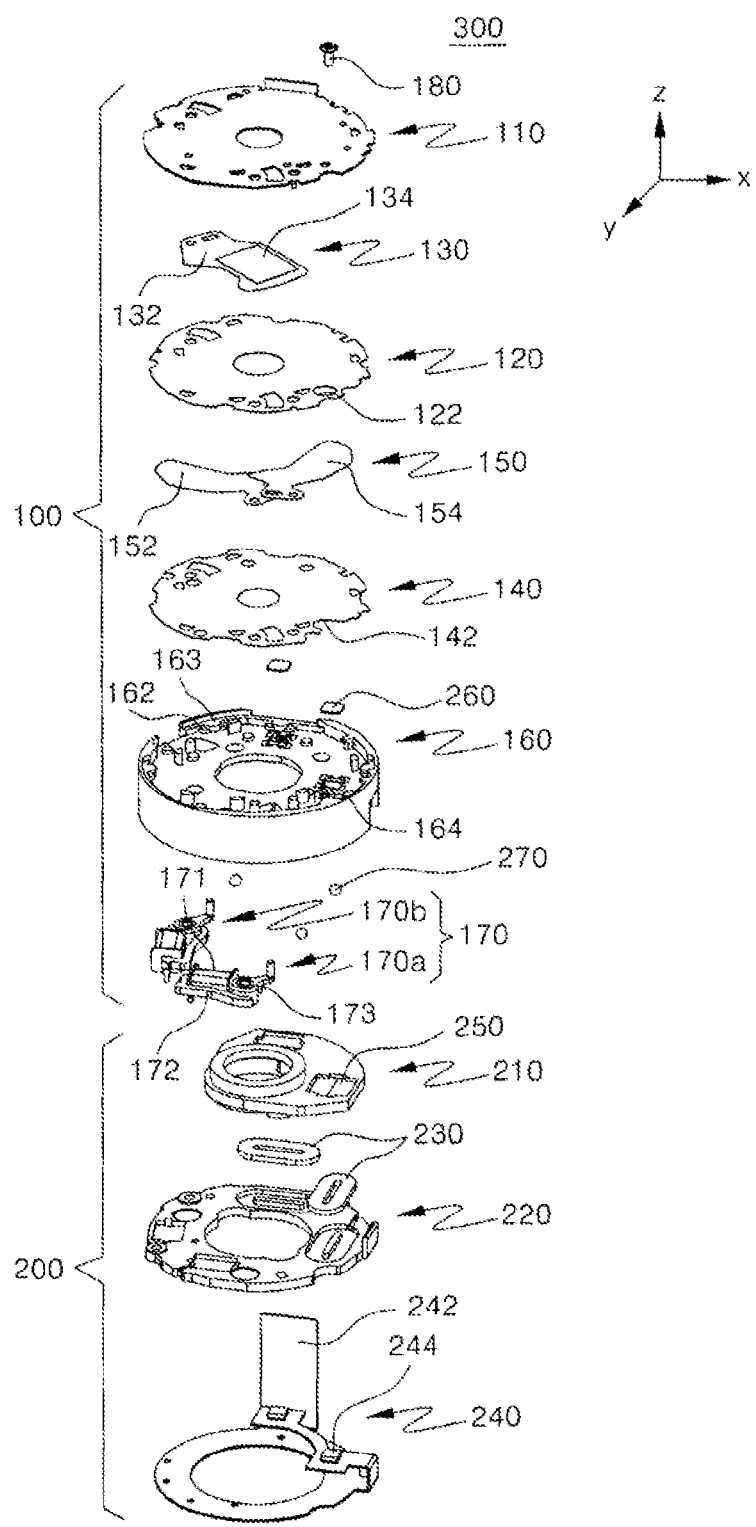
FIG. 1 is an exploded perspective view of a shutter device for a camera in accordance with an exemplary embodiment of the present invention.
Figure 2:
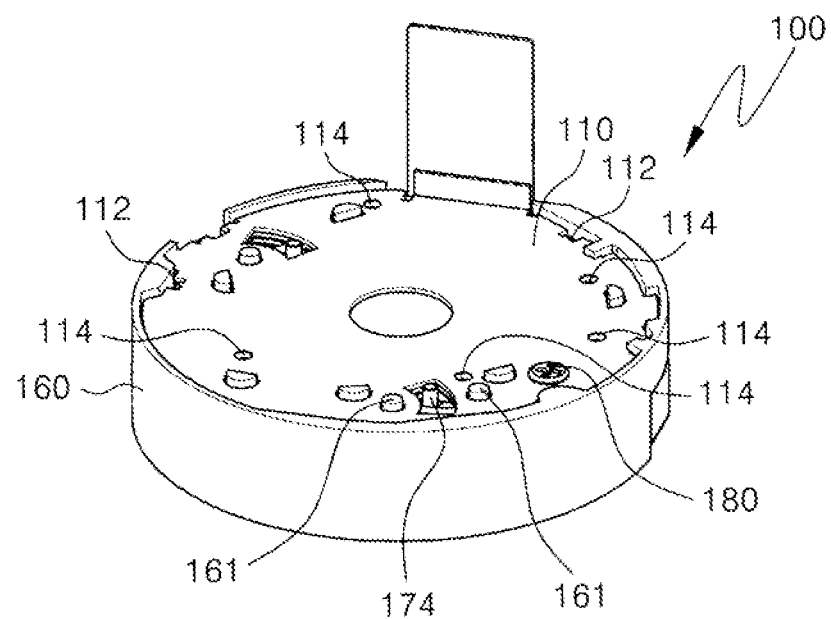
FIG. 2 is an assembled perspective view of FIG. 1.
Figure 3:
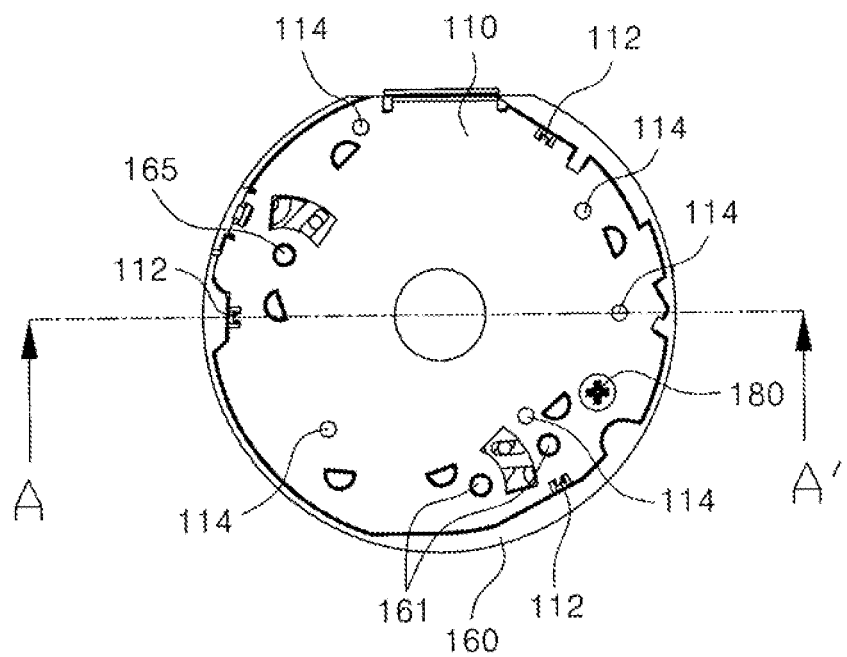
FIG. 3 is a plan view taken from the top of FIG. 2.
Figure 4:
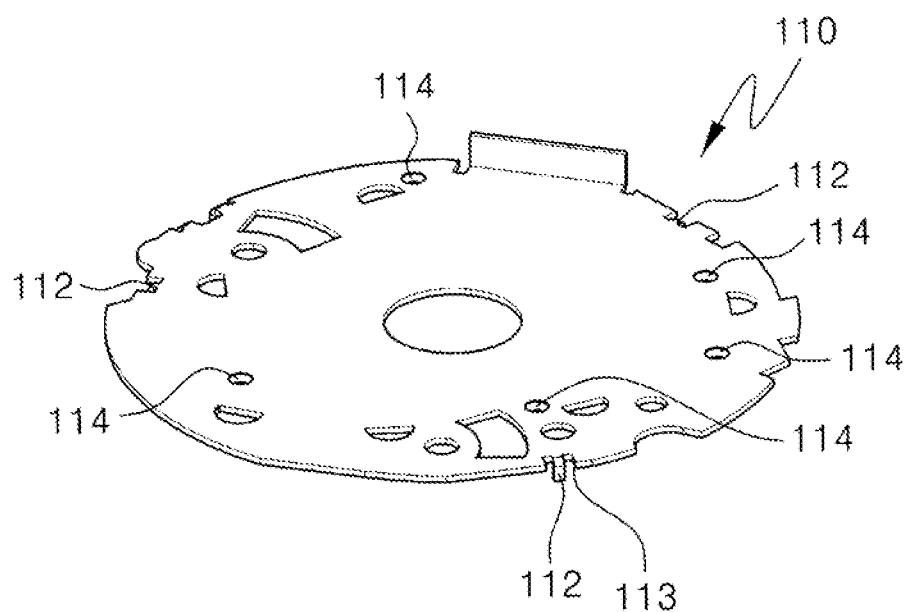
FIG. 4 is a detailed view of a top cover in accordance with the present invention.
Figure 5:
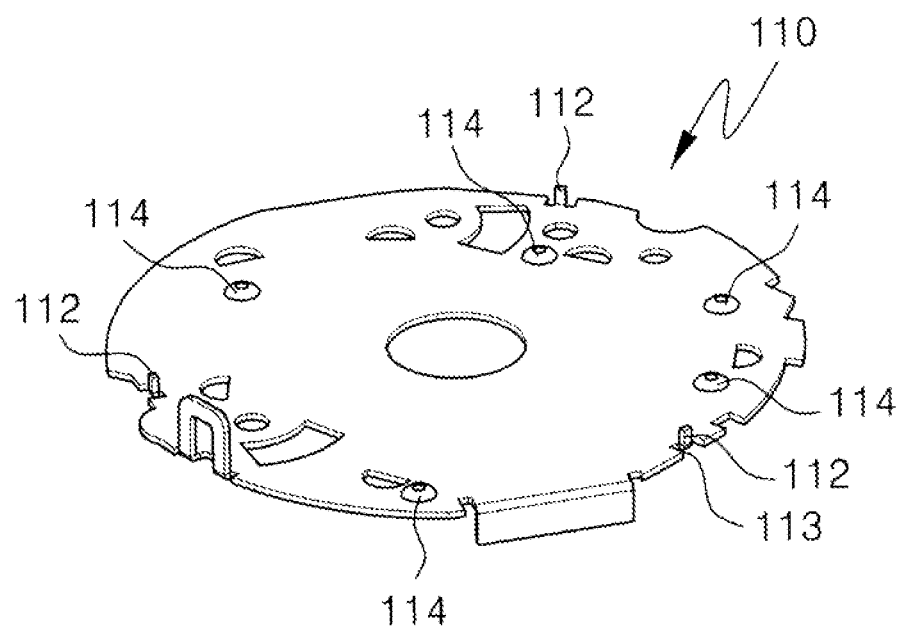
FIG. 5 is a detailed view of the structure of a bottom surface portion of a top cover in accordance with the present invention.
Figure 6:
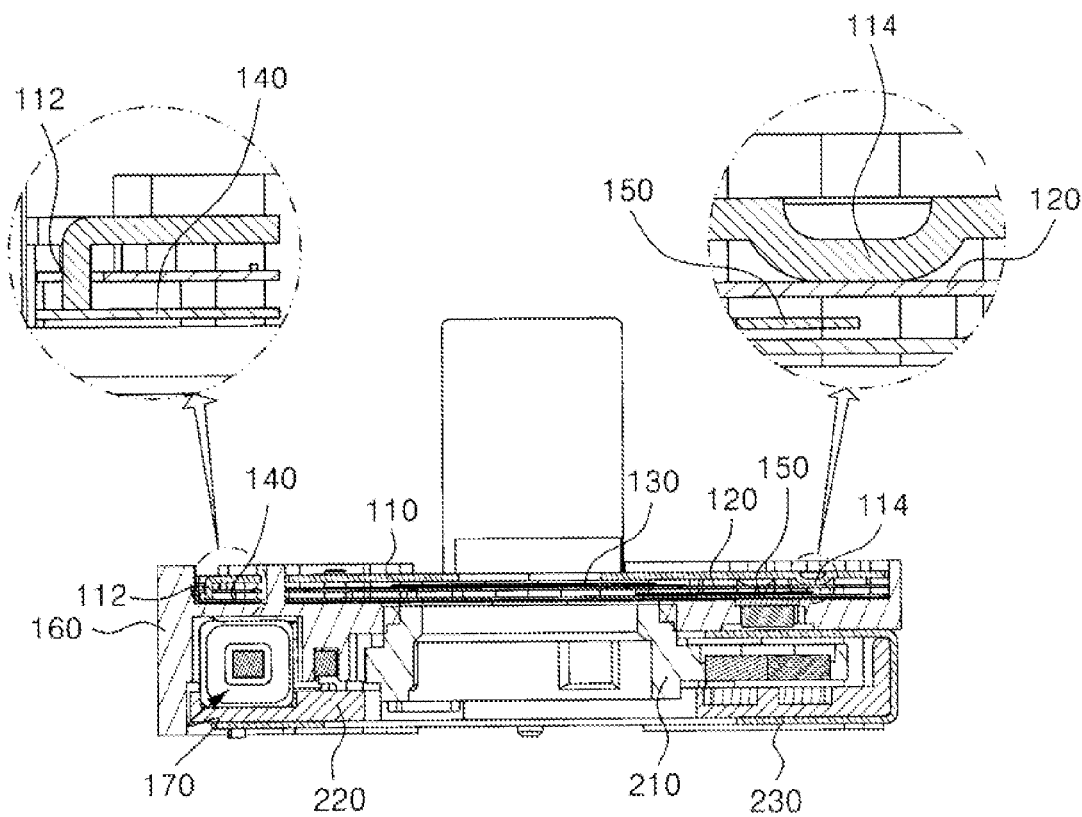
FIG. 6 is a cross-sectional view taken along line A-A of FIG. 3.

FIG. 1 is an exploded perspective view of a shutter device for a camera in accordance with an exemplary embodiment of the present invention, FIG. 2 is an assembled perspective view of FIG. 1, FIG. 3 is a plan view taken from the top of FIG. 2, FIG. 4 is a detailed view of a top cover in accordance with the present invention. FIG. 5 is a detailed view of the structure of a bottom surface portion of a top cover in accordance with the present invention, and FIG. 6 is a cross-sectional view taken along line A-A of FIG. 3.

Referring to FIGS. 1 to 6, a shutter device 300 for a camera according to the present invention comprises a shutter assembly 100 which performs the functions of a shutter of a camera and an optical image stabilization (OIS) assembly 200 which performs the function of automatic image correction.

The shutter assembly 100 comprises a base 160 on which a driving unit 170 is installed, a first plate 140 placed on the top of the base 160, a shutter blade 150 installed on the top of the first plate 140, rotated by the driving unit 170, and passing and blocking incident light, a second plate 120 installed on the top of the shutter blade 150, a light-amount adjuster 130 installed on the top of the second plate 120, rotated by the driving unit 170, and adjusting the amount of incident light, and a top cover 110 connected from the top of the light-amount adjuster 130 to the base 160.

A storage space for receiving the shutter blade 150 and the light-amount adjuster 130 is provided at the top of the base 160, and an aperture through which light is incident is formed in the center.

Moreover, the driving unit 170 for driving the shutter blade 150 and the light-amount adjuster 130 is provided at the bottom of the base 160.

The driving unit 170 comprises a first driving unit 170a for driving the shutter blade 150 and a second driving unit 170b for driving the light-amount adjuster 130.

The first and second driving units 170a and 170b comprise a yoke 172 into which a driving coil 171 is inserted and assembled and a rotor magnet 173 which is disposed opposite to the yoke 172 and forms a magnetic circuit in conjunction with the driving coil 171.

The first and second driving units 170a and 170b having the above-described configuration generates a rotational force of the rotor magnet 173 using an attractive or repulsive force generated after the magnetic circuit is formed by applying a current to the driving coil 171, thus driving the shutter blade 150 and the light-amount adjuster 130.

The driving unit 170 has the configuration and operation principle of a shutter driving unit disclosed in Korean Patent Publication No. 10-2011-0088925, and thus a detailed description thereof will be omitted.

The first plate 140 is placed on the top surface of the base 160 and received in the base 160. Moreover, the shutter blade 150 comprising a pair of blades 152 and 154 is rotatably supported on the top of the first plate 140.

The two blades 152 and 154 are disposed to face each other while partially overlapping each other. A part of each of the blades 152 and 154 is rotatably supported on each of two support shafts 161 projecting from one side of the top surface of the base 160, and the overlapping portions are inserted and connected to a pin shaft 174 formed on the rotor magnet 173 of the first driving unit 170a. By this configuration, when the rotor magnet 173 rotates, the two blades 152 and 154 connected to the pin shaft 174 are rotated in forward and reverse directions with respect to their support shafts 161, thus passing and blocking incident light.

The second plate 120 is placed on a step height 162 formed on an inner edge of the base 160 and received in the base 160. Preferably, the step height 162 is not formed over the entire edge of the base 160 but is formed with a minimum number of installation sites that can stably receive the second plate 120.

The light-amount adjuster 130 comprises a neutral density (ND) blade 132 and an ND filter 134 formed on a part of the ND blade 132 to filter incident light. One side of the ND blade 132 is inserted into a support shaft 165 projecting from the top surface of the base 160 and rotatably supported, and the other side is inserted and connected to a phi shaft 174 formed on the rotor magnet 173 of the second driving unit 17013. By this configuration, when the rotor magnet 173 rotates, the ND blade 132 connected to the pin shaft 174 is rotated with respect to the support shaft 165, thus adjusting the amount of light incident through the ND filter 132.

The top cover 110 is connected to the base 160 in which the shutter blade 150 and the light-amount adjuster 130 are received. Here, the top cover 110 is placed on the step height 163 formed on the inner edge of the base 160 and then connected thereto by fastening a bolt 180. To this end, a boss 164 having a female screw, to which the bolt 180 is fastened, is formed to project from the top surface of the base 160, and openings 142 and 122 with appropriate forms, through which the bolt 180 penetrates or passes, are formed in the first plate 140 and the second plate 120.

As such, the top cover 110 is fastened to the base 160 by means of the bolt 180, and thus it is possible to ensure strong adhesion with the base 160, compared to the existing top cover fixing structure in which the top cover is placed on a step height formed on an inner circumference of a base and attached thereto by an adhesive. In particular, it is not necessary to apply an adhesive to the inner circumference of the base, and thus it is possible to facilitate the assembly, reduce the assembly time, and prevent the operational performance of the shutter device from deteriorating due to the adhesive penetrating the inside of the base.

Here, the number of bolts fastened and their installation locations may be freely changed within the range that does not interfere with the operation of the shutter blade 150 and the light-amount adjuster 130 and reflected in the design.

As such, when the top cover 110 is connected to the base 160 using the bolt 180, there is an advantage that the adhesion of the top cover 110 increases. However, the inner part of the top cover 110, to which the bolt 180 is fastened, has no support structure, and thus a mechanical support is required.

Thus, in the present invention, when the top cover 110 is connected to the top of the base 160, a plurality of first supports 112 and second supports 114 are formed on the bottom surface of the top cover 110 so as to provide a smooth operating space of the shutter blade 150 and the light amount adjuster 130 and, at the same time, to ensure sufficient supporting force of the top cover 110 with respect to the base 160.

That is, a plurality of first supports 112 are formed at a height that allows the shutter blade 150 is smoothly operated such that the first supports 112 are supported on the top surface of the first plate 140 and, at the same time, a plurality of second supports 114 are formed at a height that allows the light-amount adjuster 130 is smoothly operated such that the second supports 114 are supported on the top surface of the second plate 120.

Here, each of the first support 112 is formed into a shape that is bent downward from the edge of the top cover 110, and a cut groove 113 having a predetermined width is formed on the left and right sides of the first support 112. Thus, during the formation of the first support 112 on the top cover 110 or during the assembly of the top cover 110, a clamping means is clamped onto the portion where the cut groove 133 is formed such that the formation of the first support 112 or the assembly can be facilitated.

These first supports 112 are disposed at regular intervals on the edge of the top cover 110 and, in this embodiment, a total of three first supports 112 are disposed at an interval of 120 degrees from each other with respect to the center of the top cover 110. Moreover, when the first supports 112 are designed to be located on a thick sidewall of the base 160, it is possible to further increase the support stiffness of the top cover 110 by the first supports 112.

Each of the second supports 114 is formed into a hemispherical shape that projects from the bottom surface of the top cover 110. Moreover, the bottom of the second support 114, which is in contact with and supported by the top surface of the second plate 120, is processed into a flat surface to increase the contact area with the second plate 120, thus increasing the support stiffness.

These second supports 114 are installed randomly in appropriate positions of the top cover 110, which do not interfere with the operation of the shutter blade 150 and the light-amount adjuster 130, thus increasing the support stiffness.

Meanwhile, the OIS assembly 200 which performs the function of automatic image correction to compensate for blurring due to hand-shake is connected to the bottom of the shutter assembly 100.

The OIS assembly 200 comprises a bottom cover 220 connected to the bottom of the base 160 of the shutter assembly 100, a mover 210 provided on the top of the bottom cover 220 to be movable in the plane direction (X-Y direction), a mover driving unit for moving the mover 210 in the plane direction, and a bottom frame 240 including a PCB 242, to which a current is applied, and connected to the bottom of the bottom cover 220.

The mover 210 is interposed between the base 160 of the shutter assembly 100 and the bottom cover 220 of the OIS assembly 200, moved in the plane direction by the operation of the mover driving unit, and performs a hand-shake correction function.

Here, a plurality of balls 270 as rolling members are provided between the base 160 and the mover 210 such that during the plane movement, the mover 210 can be in rolling contact with the base 160 by means of the balls 270, thus ensuring smooth operation.

The mover driving unit comprises a pair of coils 230 provided in the X-Y direction on the bottom cover 220, permanent magnets 250 provided in the mover 210 to correspond to the coils 230, yokes 260 provided in the base 160 to correspond to the permanent magnets 250, and a hole sensor 244 provided in the bottom frame 240 and detecting the movement position of the mover 210.

Thus, the permanent magnets 250 are moved by an electromagnetic force generated by applying a current to the coils 230 of the mover driving unit, and thus the mover 210 moves in the plane direction. The movement of the mover 210 in a direction that an object image is incident on a camera device is constrained by an attractive force between the yokes 260 and the permanent magnets 250, thus achieving hand-shake correction. The principle of hand-shake correction by the mover driving unit is disclosed in detail in Korean Patent Publication No. 10-2007-0070145, and thus a detailed description thereof will be omitted.

As such, the shutter device for the camera according to the present invention employs the connection structure in which the top cover 110 is fastened to the base 160 by means of the bolt 180, unlike the existing to cover connection structure in which the top cover is placed on a step height formed on the inner circumference of the base and attached thereto by an adhesive, and thus it is possible to ensure strong adhesion between the top cover and the base and connect the top cover to the base using a simple and robust structure without applying an adhesive to the entire inner circumference of the base. As a result, it is possible to facilitate the assembly and reduce the assembly time. Moreover, it is possible to prevent the operational performance of the shutter device from deteriorating due to the adhesive penetrating the inside of the base.

Furthermore, the first supports 112 and the second supports 114 are formed on the bottom surface of the top cover 110 such that the deformation of the top cover due to the fastening of the bolt 180 can be compensated, the operating space of the shutter blade 150 and the light-amount adjuster 130 can be effectively divided by the first and second supports 112 and 114 and, at the same time, the first plate 140 and the second plate 120 can be located in fixed positions, thus improving the mechanical stability.

As described above, according to the shutter device for the camera of the present invention, in which the plurality of supports, which can be simultaneously placed and supported on two plates for dividing the operating space of the shutter blade and the light-amount adjuster, are formed on the bottom surface of the top cover, it is possible to effectively provide the operating space of the shutter blade and the light-amount adjuster, further improve the assemblability of the top cover, and improve the mechanical stability according to the assembly.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A shutter device for a camera comprising a driving unit for driving a shutter blade and a light-amount adjuster, the shutter device comprising:
 a base on which the driving unit is installed;
 a first plate placed on the top of the base;
 a second plate disposed on the top of the first plate;
 a top cover including a plurality of first supports bent downward and a plurality of second supports projecting downward,
 wherein the first supports extend to pass through the second plate and in contact with the top surface of the first plate and configured to support the top surface of the first plate, and the second supports are supported on the top surface of the second plate, wherein the shutter blade is disposed between the first plate and the second plate.

2. The shutter device of claim 1, wherein the first supports are disposed at regular intervals on the edge of the top cover.

3. The shutter device of claim 2, wherein a cut groove having a predetermined width is formed on the left and right sides of the first support.

4. The shutter device of claim 1, wherein the first supports are disposed on a thick sidewall of the base.

5. The shutter device of claim 1, wherein each of the second supports is formed into a hemispherical shape that projects from the bottom surface of the top cover.

6. The shutter device of claim 1, wherein the light-amount adjuster is disposed between the top cover and the second plate.

* * * * *